US012631218B2

(12) United States Patent
Giehl

(10) Patent No.: US 12,631,218 B2
(45) Date of Patent: May 19, 2026

(54) ROLLING BEARING DEVICE APPARATUS WITH SEAL AND BYPASS DEVICE

(71) Applicant: Schaeffler Technologies AG & Co. KG, Herzogenaurach (DE)

(72) Inventor: Sebastian Giehl, Burgebrach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 147 days.

(21) Appl. No.: 18/568,280

(22) PCT Filed: Jun. 2, 2022

(86) PCT No.: PCT/DE2022/100413
§ 371 (c)(1),
(2) Date: Dec. 8, 2023

(87) PCT Pub. No.: WO2022/258106
PCT Pub. Date: Dec. 15, 2022

(65) Prior Publication Data
US 2024/0280144 A1 Aug. 22, 2024

(30) Foreign Application Priority Data

Jun. 10, 2021 (DE) .................... 10 2021 114 965.7

(51) Int. Cl.
*F16C 41/00* (2006.01)
*F16C 33/58* (2006.01)

(52) U.S. Cl.
CPC .......... *F16C 41/002* (2013.01); *F16C 33/583* (2013.01)

(58) Field of Classification Search
CPC ......... F16C 41/002; F16C 19/52; H02K 11/40
See application file for complete search history.

(56) References Cited

U.S. PATENT DOCUMENTS

| 6,755,572 B1 * | 6/2004 | Kinbara | .................. F16C 19/52 384/488 |
| 2018/0091027 A1 * | 3/2018 | Pfeffer | .................. H01R 39/64 |

(Continued)

FOREIGN PATENT DOCUMENTS

| CN | 101512169 A | 8/2009 |
| CN | 105179466 A | 12/2015 |

(Continued)

OTHER PUBLICATIONS

Source: Germany Patent and Trademark Office, Office Action dated Mar. 21, 2022, for priority Germany Patent Application 10 2021 114 965.7.

(Continued)

*Primary Examiner* — John Olszewski
*Assistant Examiner* — Aimee Tran Nguyen

(57) ABSTRACT

A rolling bearing apparatus includes a first machine element, a second machine element, a rolling bearing, a seal, and a bypass device forming an electrical connection between the first machine element and the second machine element. The rolling bearing has an axially aligned axis of rotation, a first bearing ring, a second bearing ring arranged concentric to the first bearing ring on the axis of rotation and fastened to the first machine element, and rolling elements arranged radially between the first bearing ring and the second bearing ring. The seal is arranged radially between the first bearing ring and the second bearing ring. The bypass device has an electrically conductive bypass conductor formed from loop-shaped stitched fibers and a holder holding the bypass conductor in an electrically conductive manner. The holder is fastened to the second bearing ring radially between the first machine element and the second bearing ring.

12 Claims, 11 Drawing Sheets

(56)               References Cited

U.S. PATENT DOCUMENTS

| | | |
|---|---|---|
| 2021/0115974 A1 | 4/2021 | Schamin |
| 2023/0015934 A1 | 1/2023 | Schamin et al. |
| 2024/0271665 A1 * | 8/2024 | Giehl ...................... F16C 19/26 |

FOREIGN PATENT DOCUMENTS

| | | | | |
|---|---|---|---|---|
| CN | 212672226 | U | 3/2021 | |
| DE | 102015206520 | A1 | 10/2016 | |
| DE | 102015224044 | A1 | 10/2016 | |
| DE | 102016010926 | A1 | 9/2017 | |
| DE | 102017106695 | B3 | 4/2018 | |
| DE | 102018115732 | A1 | 1/2020 | |
| DE | 102018117315 | A1 | 1/2020 | |
| DE | 102014010269 | B4 | 6/2020 | |
| DE | 102019112825 | A1 * | 11/2020 | ........... F16C 41/002 |
| WO | 2016171929 | A1 | 10/2016 | |
| WO | WO-2018177461 | A1 * | 10/2018 | ............ H02K 11/40 |
| WO | 2020194191 | A1 | 10/2020 | |
| WO | 2022037743 | A1 | 2/2022 | |

OTHER PUBLICATIONS

Source: Office Action Corresponding to Chinese Patent Application No. 202280031494.2, dated Mar. 10, 2026.

* cited by examiner 23, 46

64

61

62

64

23, 46

61

62

23, 46

61

ROLLING BEARING DEVICE APPARATUS WITH SEAL AND BYPASS DEVICE

CROSS-REFERENCE TO RELATED APPLICATIONS

This application is the United States National Phase of PCT Appln. No. PCT/DE22/100413 filed Jun. 2, 2022, which claims priority to German Application No. DE102021114965.7 filed Jun. 10, 2021, the entire disclosures of which are incorporated by reference herein.

TECHNICAL FIELD

The present disclosure relates to a rolling bearing apparatus which is formed from at least one rolling bearing, a seal and a bypass device.

BACKGROUND

Rotor shafts in electric machines are usually mounted with rolling bearings. Unwanted voltage potentials often arise between the rotor shafts and housings of electric motors and generators. If no countermeasures are taken, these voltage potentials are discharged via the rolling bearings. The current flowing through the affected rolling bearing can generate sparks in the rolling contact between the rolling elements and the raceways. The rolling raceways are damaged by melting indentations or erosion indentations.

Measures are already known which are intended to prevent the build-up of voltage potentials or the discharge of these voltage potentials via the rolling bearings. Bypass devices are used, for example, with which discharges are conducted "around" the rolling bearings of the electric motor in a bypass manner via what are termed shaft grounding rings. Such a bypass device consisting of a shaft grounding ring is disclosed in DE 10 2016 010 926 A1. This shaft grounding ring has a disk-like, electrically conductive bypass conductor, which is clamped between two conductive angle plates towards the housing and which rests in an internally elastically preloaded manner on a shaft. The angle plates forming the holder of the bypass conductor are inserted into a housing at any suitable points. The bypass conductor consists of conductive material that has a lower resistance to flowing currents than steel, for example. The advantage of such bypass devices is that the shaft grounding ring is simple and inexpensive to manufacture.

Experts also like to integrate bypass conductors into sealing devices. An example of a buffer seal designed as a bypass conductor is disclosed in DE 10 2014 010 269 B4. The buffer seal is connected in a sealing manner in series upstream of a main seal and simultaneously, in the manner of a bypass conductor, establishes an electrically conductive connection between two machine elements. The disk-like bypass conductor is also intended to protect the sealing lip of the main seal against contamination from the environment and is fastened to the main seal. The main seal sits in the housing with a holder formed from an angle plate.

In general, bearing manufacturers are interested in using such bypass conductors in the immediate vicinity of the rolling bearings, which can be exposed to the damage described at the beginning due to the discharge of the voltage potentials. In addition, the bypass conductors should be accommodated in a space-saving manner. This is why such bypass conductors are integrated into the main seals of rolling bearings, for example. Such an apparatus is disclosed in DE 10 2015 224 044 A1. The main seal used in this apparatus is interfused with conductive filler.

SUMMARY

The present disclosure provides a rolling bearing apparatus which can be produced easily and inexpensively.

According to the disclosure, it is envisaged that the bypass conductor held by the holder, which is radially fastened between one of the bearing rings and one of the machine elements to the one of the bearing rings, consists of loop-shaped stitched fibers. In this regard, the one of the bearing rings is seated in the one of the machine elements or on the one of the machine elements. The holder sits, for example, on an outer ring radially between the outer ring and a housing, or alternatively on an inner ring radially between the inner ring and a shaft. The holder has one retaining ring or multiple retaining rings as well as one retaining disk or multiple retaining disks. Generally speaking, due to cheaper and simpler manufacturing implementation, semi-finished products made of fabric are used for carbon fiber components which are then laminated into a polymer matrix. Positioned fibers, also known as "tailored fiber placement", are currently only used for aesthetic reasons in visible carbon components or for the targeted reinforcement of functional components, since this creates a very high level of complexity in production. Thus, from these aspects for the application envisaged here, a special, cost-intensive technology is used here in order to make targeted use of the conductive properties of carbon fibers.

The term "stitched fibers" used below is to be understood as meaning both individual fibers and fiber pairs or fiber bundles. In the following, the term "stitching" describes any connection of the fibers, fiber pairs, or fiber bundles which uses an additional thread for connection. Sewing, crocheting, or the like, can also be seen as equivalent here.

The sealing effect of sealing devices is often increased by means of pre-seals when the rolling bearings could be heavily stressed by dirt in the environment. The pre-seal and the main seal are connected in series in terms of the effectiveness thereof, i.e., contamination in the environment around the rolling bearing reaches the pre-seal first. The main seal protects the interior of the bearing, i.e., the zones of rolling contact between the rolling elements and the raceways. One main seal each is usually arranged to the left and right of the rolling raceways. The pre-seal is located upstream of the main seal in the direction of the outside environment of the rolling bearing and is usually intended to keep coarse contamination away from the main seal.

An intermediate space is often created between the pre-seal and main seal due to an axial distance. If both seals are in sealing contact, pressure differences can arise between the air pressure in the environment of the sealing device and that of the intermediate space. For example, when the rolling bearing is cold or cooling down and the ambient air is warmer, there is a comparatively low pressure in the intermediate space. Since the pre-seal does not usually provide a hermetically pressure-tight seal, air from the environment is drawn into the intermediate space due to the negative pressure. In the process, humidity, liquids and dirt particles are unintentionally carried into the intermediate space and held there. Over time, for example also due to pressure differences between the air pressures of the intermediate space and the zones of rolling contact, these contaminants reach under the sealing lip of the main seal and enter into the zones of rolling contact. The sealing lip of the main seal becomes damaged and contaminants enter into the interior of the rolling bearing to be sealed and can damage it, for example by contaminating the lubricating grease. On the other hand, the discharge device described here is constructed both from a holder, which provides recesses for air permeability, and from the bypass conductor, which is permeable to air and thus avoids such pressure differences.

According to one embodiment, the loop-shaped stitched fibers of the bypass conductor are stitched in a meandering manner. Owing to the high positioning effort and associated high cycle times, punched-out round fabric blanks or radially circumferential, i.e., circular, patterns would generally be used for circular components. In order to make targeted use of the better conductivity in the fiber direction, a loop-shaped design of the bypass conductor is used for the application mentioned here. In the ideal case, this extends from the outer region of the holder to the contact region with the further machine element that can be moved mutually.

In a further embodiment, the loop-shaped stitched fibers of the bypass conductor are stitched with a double-superimposed meandering shape. This is particularly suitable for realizing an even higher number of individual fibers for the transmission of electrical currents and for reducing electrical resistance, while realizing a flat design at the same time.

In the rolling bearing apparatus, the bypass conductor can also be formed such that the stitched loop shape of the fibers depicts a polygon shape. This means that the loops encompass the center, i.e., the inner machine element.

Furthermore, the bypass conductor can be designed in such a manner that the loop-shaped stitched fibers of the bypass conductor have fiber cross-sections which are open proximally to the axis of rotation. Thus, the bypass conductor is constructed in such a way that the loops are realized only in the distal sections, and the fiber cross-sections, which point towards the axis of rotation, are open. Thus, the bypass conductor constitutes individual loops that are stitched together.

The bypass device can contain a bypass conductor such that the loop-shaped stitched fibers are stitched with a further, concentrically arranged fiber bundle. Thus, an even further improved cohesion of the fibers can be ensured, and contamination due to fiber loss of the bearing or the installation space of the rolling bearing apparatus can be avoided. In addition, stitching with a further, concentrically arranged fiber bundle increases the rigidity of the bypass conductor, which ensures that the current-conducting fibers run centrally.

In an example embodiment, the loop-shaped stitched fibers of the bypass conductor of the rolling bearing apparatus comprise components of carbon or carbon derivatives. These components are particularly suitable for conducting current in a bypass conductor of a rolling bearing apparatus, since they are characterized by high elasticity with a high elongation at break and very good electrical conductivity.

In a further embodiment of the rolling bearing apparatus, the loop-shaped stitched fibers of the bypass conductor are stitched on a textile base fabric. This enables ideal positioning during production. Furthermore, the bypass conductor can thus have special characteristics during use with respect to wear and electrical behavior. It is conceivable to disintegrate the textile base fabric again in a subsequent step, for example a washing process.

One or more bypass devices are integrated into the rolling bearing apparatus. In the disclosed device, the bypass conductor is integrated into the rolling bearing and is nevertheless fastened to the rolling bearing in such a way that it is not fastened inside the rolling bearing but in the bearing seat in order to save space radially—i.e., on the outside of the rolling bearing between one of the bearing rings of the rolling bearing and a housing or a shaft or other machine elements. No separate axial installation space is required for fastening the bypass conductor. The radial installation space is already provided due to the dimensions of the bearing ring. This has a particularly positive effect on the application in rolling bearing apparatuses with rolling bearings of small diameter rows, in which there is little radial and axial installation space between the bearing rings for the accommodation of seals and bypasses. The limited space can be fully utilized to accommodate the seal and the bypass device. The components for fastening the bypass conductor therefore do not have to be of such a delicate design and can therefore often also be produced more cost-effectively.

The rolling bearing apparatus has one rolling bearing or multiple rolling bearings. The rolling bearing is sealed against the environment or surrounding structure with one or more seals. The seal is arranged radially between the bearing rings, is of any arbitrary design, has, for example, one or more sealing lips in contact with an inner ring or an outer ring, and is seated, for example, in an outer ring or in an inner ring of the rolling bearing.

The seals affected by the subject matter of the disclosure are one or more seals, which may be designed as main seals and which seal the interior of the rolling bearing with the zones of rolling contact, the rolling elements, and, if necessary, with the cage to the outside. Main seals can be in sealing contact or be designed as gap or labyrinth seals. The seals have one or more sealing lips and are in full sealing contact with one of the bearing rings in the one direction and are fastened to the other of the bearing rings in the other radial direction. Alternatively, the seals are fixed to the bearing ring in the one radial direction, and seal without contact in the other radial direction. In sealed rolling bearings, the seals are located in the axial directions to the left and right of the rolling elements and create a space to be sealed in which the rolling elements move in the rolling contacts and cages.

The bypass device is arranged on one side of the rolling elements following the seal in the axial direction such that an intermediate space is formed between the seal and the bypass device.

At least one electrical connection is formed at least between the first and the second machine element via the bypass device. It is therefore also conceivable for further electrically conductive connections between further machine elements to be designed as permanent or even such that they can be switched on and off via the bypass device, for example.

The bypass device is composed of one or more holders and one or more electrically conductive bypass conductors. According to the disclosure, the holder is seated in or on one of the bearing rings of the rolling bearing. Thus, it is integrated into the rolling bearing or the bearing seat of the rolling bearing, and is seated either on the inner ring or on the outer ring. The holder is a component of an arbitrary design which is suitable for holding the bypass conductor in the rolling bearing.

In the disclosed device, the rolling bearing, including the bypass device, can be supplied as an assembly unit by the manufacturer of the rolling bearing. Assembly time and storage space are saved for both the rolling bearing manufacturer's customer and the rolling bearing manufacturer itself. The properties of the bypass conductor can be individually matched to the contact resistance or discharge resistance of the rolling bearing.

The respective holder and the bypass conductor are connected to one another in an electrically conductive manner. The holder is itself conductive, or the bypass conductor and the machine element are connected to each other via a separate electrical conductor—for example, via a conductive sleeve. In general, the bypass device is designed in such a way that voltage potentials are discharged via this bypass device and not via the rolling bearings.

With the at least one rolling bearing, two machine elements are mounted so that they can rotate relative to one another. In this case, one of the machine elements or the other machine element is rotatably mounted about the axis of rotation of the rolling bearing by means of the rolling bearing, or the one or the other machine element is fixed to the housing. Alternatively, both machine elements are arranged to be rotatable relative to each other about the axis of rotation of the rolling bearing. Machine elements are shafts, for example rotor shafts of an electric machine, housings, for example end shields or housings or housing sections or end shields of an electric machine, gearwheels or shafts or housings of a transmission or any other machine elements that are suitable for being mounted on or against one another by means of rolling bearings.

The axis of rotation of the rolling bearing is oriented axially in the cases considered, but can run horizontally or vertically as well as obliquely oriented in space. Radial is perpendicularly transverse to the axis of rotation.

The rolling bearing is used for the rotatable mounting of machine parts, elements and assemblies and, to reduce friction, has rolling elements which roll between the inner ring and the outer ring and thus reduce the friction in the rotatable bearing. As already stated above, the rolling bearing has an inner ring and an outer ring. Alternatively, the rolling bearing also has more than just one inner and/or outer ring. In addition, the bearing rings are alternatively also divided and each has a raceway or a portion of a raceway. One or more outer raceways are usually formed on the inner ring and accordingly one or more inner raceways on the outer ring. The rolling elements rolling on the raceways are either balls or rollers. The balls or rollers are often guided and held in cages. Rolling elements of a rolling bearing are either arranged in a row in the circumferential direction one behind the other or, alternatively, the rolling bearing has several rows of rolling elements arranged adjacent to each other. Alternatively, rolling bearings are also axial bearings. In this case, both the inner ring and the outer ring are the axial disks, which have axial raceways.

In the context of the disclosure, the bypass is to be understood as the diversion of a current or a voltage around one or more rolling bearings and/or machine parts. The rolling elements and the bearing rings are usually made of rolling bearing steel and contact each other on the raceways. The contact zones formed in this way are potential passages for currents where the discharges of concern lead to damage to the raceways already described in the BACKGROUND section.

The currents are to be diverted via the bypass or the bypass device. On the one hand, this can be "controlled" in that the bypass device or in any case the bypass conductor has comparatively lower electrical or specific electrical resistances relative to the rolling bearing.

It is conceivable for the rolling bearings to be insulated against the passage of current. For example, it is conceivable for an insulator or an insulating layer to be applied between the bearing ring or bearing rings and the machine element on/in which the bearing ring is seated. In this case, the bypass guides the discharges past but not through the rolling bearing only via the bypass elements of the bypass device seated on the rolling bearing. In this case, the holder sits at or on the insulated bearing ring and has conductive contact with the machine element. For example, the holder sits on the outer ring and is preloaded in an elastically resilient manner against the housing. Or, a sleeve sits on a shaft while the sleeve is not or is in contact with the inner ring or outer ring. Alternatively or in combination with other measures, it is also conceivable for the rolling elements to be made of non-electrically conductive material such as ceramics. In this case, the bypass device needs only to divert the current.

As previously mentioned, the holder has one retaining ring or multiple retaining rings and one retaining disk or multiple retaining disks. According to one embodiment, the holder or the retaining ring is provided with at least one cutout, e.g., a plurality of cutouts which are distributed on the circumference around the axis of rotation of the rolling bearing and which extend axially continuously through a substantially radially extending and annular disk-like base body. The retaining disk engages with at least one retaining clip in the cutout and is held on the base body. The bypass conductor is held axially between the electrically conductive retaining ring and the retaining disk. The retaining clip or the retaining clips are latched or hooked into the cutout in a form-fitting and/or force-fitting manner. Such an arrangement is easy to assemble. The individual parts of the holder can be produced inexpensively from sheet metal.

The rolling bearing apparatus separates the functions of seal and bypass conductor. In general, it can be assumed that the choice of material for a buffer seal according to the known prior art requires compromises with regard to the requirements for long-term sealing function or conductivity. The material of main seals with conductive fillers can lose elasticity and wear resistance. In addition, materials combined in this way are relatively expensive compared to standard seals and the steadfastness of the injection molds for the production thereof can be reduced compared to that for the production of standard seals due to the harder filler. In addition, for example, the air permeability of the buffer seal can be blocked if it is heavily contaminated, with the resulting negative consequences already described. In general, the cutouts ensure adequate ventilation of the intermediate space formed between the bypass device and the main seal.

In the disclosed device, the design of the bypass device is directed exclusively to the electrical conductivity and the installation situation, but not to a sealing function. If, as already mentioned at the beginning of the discussion on the prior art, bypass conductors are integrated into sealing systems, compromises must be made with regard to the choice of material properties of the seals and also the bypass conductor. When designing the bypass conductor of a bypass device according to the disclosure, only the requirements for electrical conductivity and wear resistance need to be taken into account when selecting and designing the material. A freely permeable passage for media from the environment in front of the bypass holder into the intermediate space is guaranteed in the bypass holder or the bypass device.

One way of implementing the rolling bearing apparatus is to design the retaining element or the retaining ring in such a way that it has a plurality of clamps distributed over the circumference of the one of the bearing rings, or the retaining elements are such clamps. These clamps are arranged radially between the bearing ring and the machine element, for example between the outer ring and a housing or between the inner ring and a shaft, and thereby overlap the bearing ring axially and engage behind the bearing ring radially. The clamps are designed to be elastically resilient and, between one of the machine elements and the one of the bearing rings, radially preloaded against the one of the bearing rings.

In the disclosed device, the zones on the bearing ring to which the retaining ring is fastened or against which the retaining elements are preloaded with respect to the bearing ring need not be finely machined because the retaining elements are preloaded against this zone at least in a radially elastic manner. The elasticity of the individual retaining elements is ensured by the fact that they are separated from one another circumferentially around the axis of rotation of the rolling bearing by the axially continuous cutouts. As a result, the retaining elements are lengthened by a radially extending elastic lever, starting from a base on the retaining ring. In conjunction with a snap geometry, the retaining element can bridge large tolerances when pressed on and is securely fixed axially and radially. The retaining rings are easy and inexpensive to produce from sheet metal or spring steel.

According to a further possibility of implementing the rolling bearing apparatus, one or more clamping elements or retaining clips formed on the retaining disk or separately, each or more than one, engage in one of the cutouts and hold the retaining disk and the retaining ring to each other in a form-fitting manner. In this regard, the bypass conductor is clamped axially between the clamping element and the holder or between the retaining disk and the retaining ring. The clamping element can, for example, be a simple clamp that is inserted into the cutout, or the clamping element or the retaining clip are formed on the retaining ring of the holder. Clamping elements are releasably or non-releasably clamped to the retaining ring, and retaining clips are, for example, clipped or snapped into the cutouts in a form-fitting manner and, under certain circumstances, can also be released again.

It is also conceivable for the holder to rest on the one of the bearing rings in an electrically conductive manner when it is in contact with the one of the bearing rings. The holder is made of electrically conductive material or has a conductive coating or is provided with conductive elements. It is crucial that an electrically conductive connection is formed between the machine element and the holder either via the electrically conductive bearing ring or in direct contact with the holder. The bearing ring is made of a conductive material or has an electrically conductive coating. In general, it can be assumed in this case that the electrical resistance of the bypass device is lower than the electrical resistance in the passage through the rolling contacts of the rolling bearing.

The rolling contacts are the contacts against which the rolling elements bear on the raceways during operation or when the respective rolling bearing is at a standstill. The zones of rolling contact are thus the zones in which the rolling elements roll on the rolling raceways of the bearing rings when the rolling bearing is in operation. The electrically conductive connection for discharging the voltage potentials between the first and second machine element is established by means of the bypass device. As already mentioned at the outset, the machine elements can be housings or shafts or alternatively also other machine parts. It is therefore conceivable for the second machine element to be the inner ring of the rolling bearing. It is therefore not ruled out that at least one bearing ring of the rolling bearing is a conductive component of the bypass device.

It is also conceivable for the second machine element to be a hollow-cylindrical component. In this case, the hollow-cylindrical component is a component of the bypass device, in particular when the rolling bearing is prepared with a bypass device as an assembly unit for installation. The second bearing ring, designed as at least one inner ring, and the hollow-cylindrical component are connected to one another. Transmission manufacturers often fight for every millimeter of installation space. This also has an effect on the requirements for the rolling bearings, which should consequently be designed in a space-saving manner in the radial direction. However, in standard rolling bearings, a minimum cross-section of the bearing rings is required to absorb the stresses that occur in rolling contact. For example, for ball or roller bearings, radial minimum flange heights are required. The height of the flanges, which rise radially above the respective rolling raceway at the side of the rolling raceways, influences the radial dimension of the annular gap between the inner ring and the outer ring. As a result of these measures, the remaining annular gap for the installation of a bypass device can be too small.

In addition, a radial contact surface is required for the contact of the bypass conductor with either a machine element or the bearing ring, on which the bypass conductor makes the conductive transitional contact between the machine element or the bearing ring. For this purpose, either the bearing ring can be extended or the contact surface on the machine element can be prepared separately. Both options are conceivable, although the effort involved in extending the bearing ring can be relatively high. In this case, the contact surface can be prepared on a machine element in the form of a hollow-cylindrical component, which is either attached to the bearing ring or is seated on the machine element. The hollow-cylindrical component can be designed in a simple way as a sleeve cut from a tube or wound or drawn from sheet metal. The sleeve can then be fixed to the one of the bearing rings and extend in the axial direction beyond the other of the bearing rings without affecting the required installation space for the rolling bearing. Such a sleeve can be produced inexpensively and can also be provided with a conductive coating, for example. It can be exchanged for a wide variety of designs thereof, without the rolling bearing per se needing to be changed.

The sleeve saves radial installation space so that more radial space is available for the bypass device. In addition, the sleeve can be designed as a conductive component with respect to the shape thereof and the choice of materials in a manner that would not be possible with a bearing ring, for example, because generally speaking, the requirements of load capacity and service life of a rolling bearing must primarily be taken into account in the design and material selection of a bearing ring. In addition, special friction or sliding properties in the contact zone with the bypass conductor can be taken into account when coating or choosing the material of the sleeve.

The rolling bearing with all the components mentioned so far is designed, possibly also in combination with one or both machine elements, as a self-retaining assembly unit according to an exemplary embodiment. On the one hand, such an assembly unit keeps the storage and transport capacities positively small and, on the other hand, the effort involved in installing the rolling bearing apparatus in a vehicle transmission, an electric machine, an electrically operated axle, or in any other arbitrary system is lower compared to the individual installation of components.

The rolling elements of the rolling bearings affected by the disclosure can be guided between the bearing rings with or without cage(s). A cage has one or two side edges. Cages with only one side edge are shaped like a crown or comb, i.e., cage webs protrude in the axial direction from the side edge like the spikes of a crown or the tines of a comb. The gaps between the spikes or tines adjacent in the circumferential direction are the pockets in which the rolling elements are accommodated. The unwindings of the cages are designed in imagined unwindings in flat planes in the manner of a punched tape for balls and as ladder-shaped for rollers. In both cases, the cage webs connect two side edges that run parallel to each other. The gaps, which appear hole- or window-shaped in the flat planes, are pockets formed three-dimensionally in the circumferential direction between the cage webs, in which the rolling elements are accommodated.

As already mentioned, transmission manufacturers often fight for every millimeter of installation space. This also has an effect on the requirements for the rolling bearings, which should consequently be designed in a space-saving manner in the axial direction. The aforementioned measure also contributes to saving axial installation space. In the disclosed device, the retaining elements of the retaining ring engage over the bearing ring in the axial direction and engage radially behind it. For this purpose, as provided with one embodiment, a radial annular gap is formed between the bearing ring and the machine element. On one side, from the end of the bearing ring, the retaining elements engage axially in the annular gap formed, for example, between the outer ring and the housing. Existing installation space is used without the bearing ring needing to be lengthened axially for the purpose of a retaining zone for fastening the bypass device.

It is conceivable to design the rolling bearing apparatus in such a way that, when rolling bearings having a cage or cages are used, at least one end of the side edge delimiting the side edge axially in the direction of the bypass conductor, or even better the entire side edge of the cage, runs radially between the axis of rotation and the retaining element of the bypass device around the axis of rotation. In this case, the axial width of the bearing ring is generally only determined by the necessary axial installation space for the seals and rolling elements and the axial width of the side edge. The fastening for the bypass device does not require any additional installation space axially. This measure is particularly effective for ball bearings in which a ball snap cage with only one side edge is used to hold the balls. The side edge runs axially on the side between the rolling elements and the bypass device and radially below-within a partial circle on which the retaining elements rest against the outer ring running around the axis of rotation of the rolling bearing.

The task of the main seals in rolling bearings is, as already mentioned at the beginning, to seal the interior of the rolling bearing from the environment. Another task of the main seal is to keep the lubricating grease in the rolling bearing, which is vital for the function of the rolling bearing. Lubricating grease contains lubricating oil and grease thickeners. The rolling contact is substantially lubricated with the lubricating oil. The grease thickeners store the lubricating oil and secrete it during the operation of the rolling bearing. Since the lubricating oil is relatively liquid, it can easily infiltrate the sealing lips of the main seals in certain cases. The lubricating oil is transported from the zones of rolling contact in front of the main seal into the environment of the rolling bearing and is disadvantageously missing in the lubrication of the rolling bearing. A further disadvantage could arise with regard to the disclosure if the lubricating oil, as described above, is unintentionally transported into the intermediate space between the main seal arranged on the side of the bypass device and the bypass conductor. Due to the lack of a sealing function of the bypass device, the lubricating oil located there could absorb and bind to itself the dirt particles that enter the intermediate space through the cutouts of the bypass device. As a result, a layer of dirt could form in the intermediate space, the components of which could reach under the main seal and thus into the rolling contact of the rolling bearing over the course of time.

The volume of a side edge of the cage arranged on the side of the rolling elements facing the bypass device takes up a large proportion of the space in the annular gap that is formed on this side of the rolling elements between the two bearing rings. This space is therefore hardly filled with lubricating grease and instead only the region inside the rolling bearing on the side of the side edge facing away from the bypass device is filled. Accordingly, there will also be less lubricating oil on the side where the side edge of the cage runs around. The risk of loss of lubricating oil on the side of the bypass device is therefore positively reduced by the arrangement of the side edge on this side.

BRIEF DESCRIPTION OF THE DRAWINGS

In the following, the present disclosure is explained in more detail with reference to exemplary embodiments. In the drawings.

DETAILED DESCRIPTION

Figure 1:
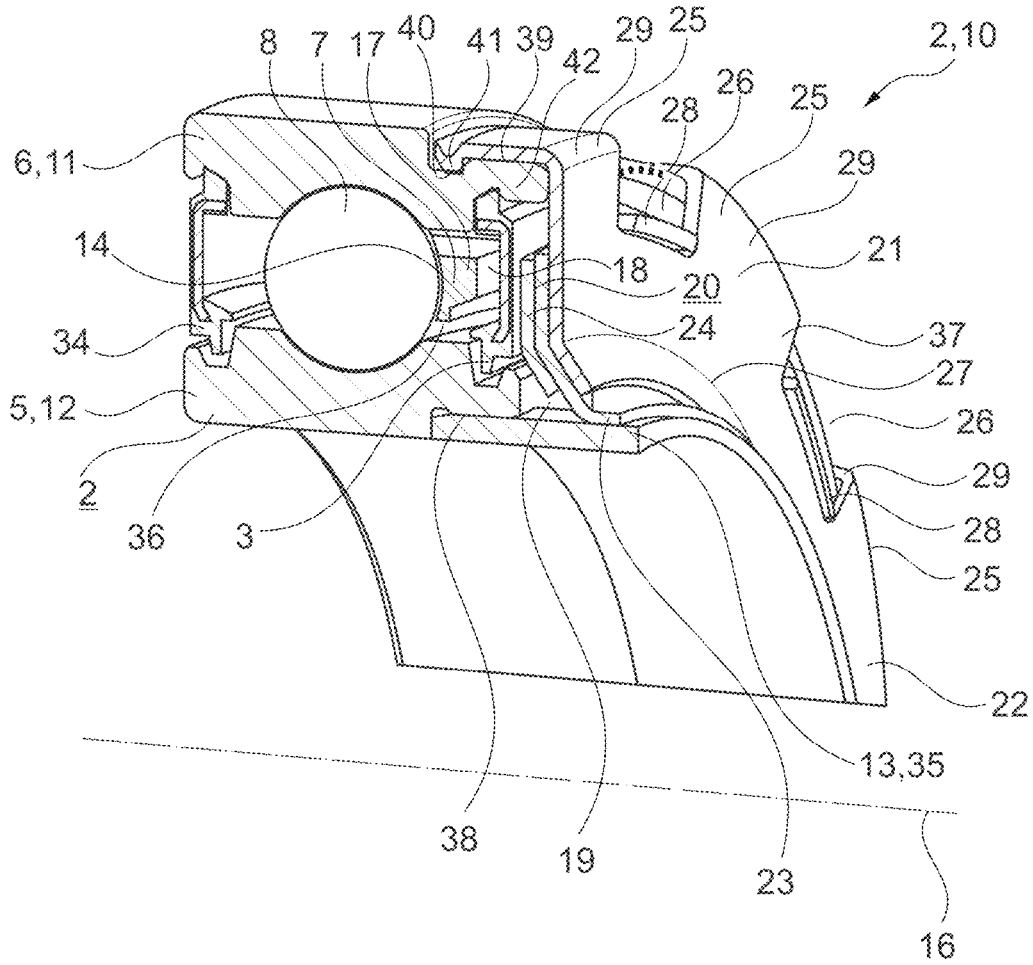
FIG. 1 shows an exemplary embodiment of a rolling bearing 2 according to the disclosure in a partial section along the axis of rotation 16 of a spatial representation of the rolling bearing 2.
Figure 3:
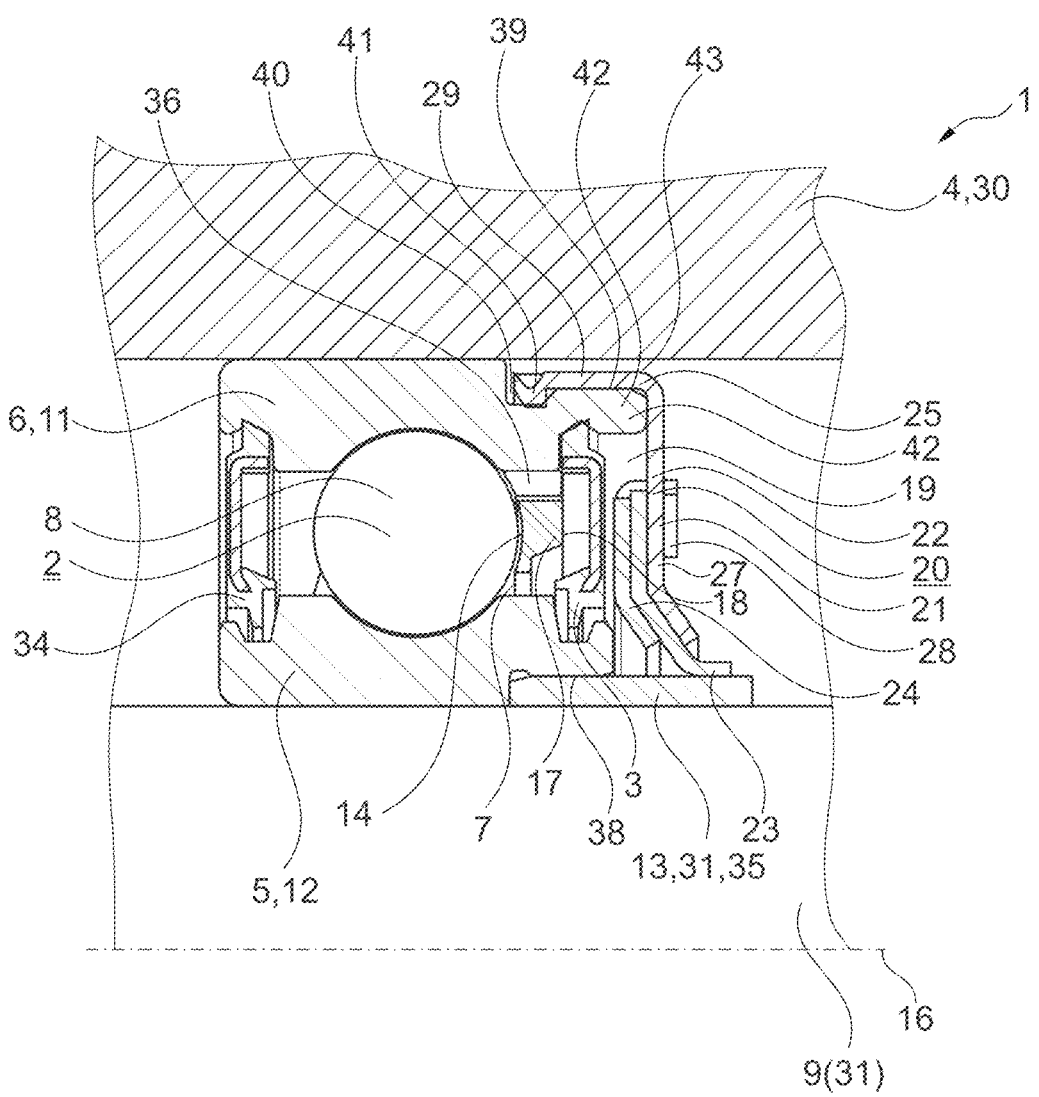
FIG. 3 shows an exemplary embodiment of the rolling bearing apparatus 1 having the rolling bearing 2 shown in FIG. 1, in a longitudinal section along the axis of rotation 16.

FIG. 3—The rolling bearing apparatus 1 is formed from the rolling bearing 2 shown in FIG. 1, the seal 3, the seal 34 and the bypass device 20, and has a first machine element 30 designed as a housing 4, a shaft 9, and a sleeve 35 designed as a second machine element 31. The shaft 9 is alternatively the second machine element 31.

FIGS. 1 and 3—The rolling bearing 2 has at least one first bearing ring 5 designed as an inner ring 12 and a second bearing ring 6 designed as an outer ring 11 as well as a bypass device 20. The bearing rings 5 and 6 are arranged concentrically on the axis of rotation 16 of the rolling bearing 2. The rolling bearing 2 designed as a deep groove ball bearing is provided with rolling elements 8 which are arranged radially between the bearing rings 5 and 6 and which are balls. The balls are arranged in a cage 7. The cage 7 has a number of pockets 14 corresponding to the number of rolling elements 8, and a side edge 17 running around the axis of rotation 16. A ball is seated in each pocket 14. The seals 3 and 34 designed as a main seal are inserted radially into the rolling bearing 2 between the bearing rings 5 and 6. In this regard, the side edge 17 runs axially between the rolling elements 8 and the seal 3 in an annular gap 36 around the axis of rotation 16. The inner ring 12 is provided with an inner cylindrical inner seat surface 38 on the inside and on the side of the bypass device 20 at a diameter step, on which the sleeve 35, designed as a hollow-cylindrical component 13, is seated, for example held by a press fit. The diameter step results from the fact that the diameter of the inner seat surface 38 is larger than the diameter of the inner ring 12 inside for the shaft seat.

The bypass device 20 has a holder 21, a retaining disk 24, an electrically conductive bypass conductor 23, and the sleeve 35. Retaining elements 25 are formed on a radially extending base body 27 of a retaining ring 22 of the holder 21, of which only one retaining element 25 is visible in the representation according to FIG. 3. The outer ring 11 is provided with a diameter step on the outside, on which an outer seat surface 39 is formed. The cylindrically formed outer seat surface 39 has a diameter which is smaller than the outer diameter of the outer ring 11 for the housing seat. The outer seat surface 39 is axially adjoined by a radial depression 40 which could consist of depressions 40 adjacent to one another circumferentially, but in this case is designed as an annular groove 40. Clamps 29 of the retaining elements 25 are radially resiliently elastic and are pushed onto the overhang during assembly, moving elastically outwards, extending axially over the outer seat surface 39 to the annular groove 40 and finally snapping into the annular groove 40 with the radial protrusions 41, then being radially latched with the latching protrusions 41 in the annular groove 40, and preferably bearing radially against the outer seat surface 39 or being radially preloaded thereagainst.

An intermediate space 19 is formed axially between the disk-shaped base body 27 and the seal 3, which is delimited outwards in the radial directions on one side by an axial overhang 42 of the outer ring 11 and on the other side by a section of the sleeve 35. The bypass conductor 23 is clamped axially between the retaining disk 24 and a base body 27 of the retaining ring 22. The retaining disk 24 is fixed to the base body 27 with retaining clips 28. Of the retaining clips 28, only one retaining clip 28 is visible in the image due to the sectional view. In the rolling bearing 2 there is an electrical connection between the outer ring 11 via the clamps 29 and the annular disk 22 to the bypass conductor 23, and from the bypass conductor 23 to the sleeve 35, and from the sleeve 35 to the inner ring 12.

Figure 2:
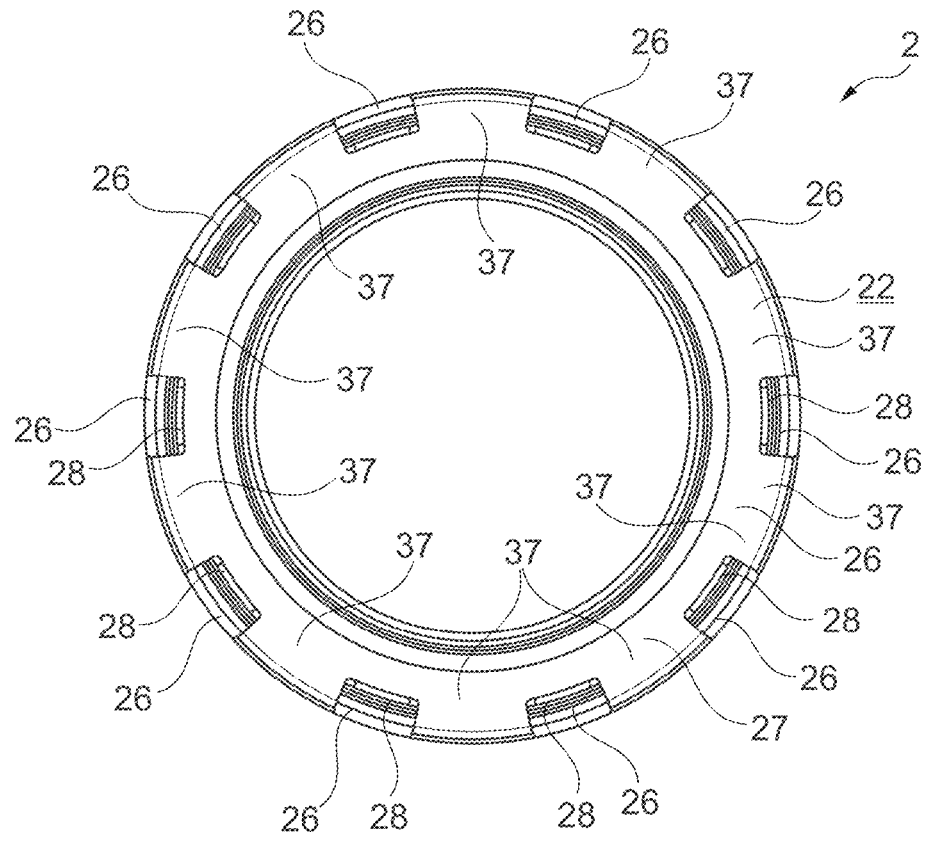
FIG. 2 shows a front view of the rolling bearing 2 according to FIG. 1.

FIGS. 1 and 2—The front of the rolling bearing 2 is substantially covered from one side by the retaining ring 22. The retaining ring 22 is provided with cutouts 26 that pass axially therethrough in a continuous manner. In this case, the cutouts 26 are open radially outwards and are delimited on both sides in the circumferential direction by a lever arm 37 of a retaining element 25 and in the radial direction inwardly by the base body 27 of the retaining ring 22. Alternatively, it is also possible for the cutouts to be windows in a form that is not shown, which are also delimited radially outwardly by the material of the base body 27. The cutouts 26 can optionally have curved contours or the rectangular contours shown. The respective retaining clip 28 extends axially through the cutout 26 and is fastened to the retaining ring 22 in a form-fitting manner.

FIG. 1—The rolling bearing 2 is an assembly unit 10 formed from the inner ring 12, the outer ring 11, the seals 3, 34, the rolling elements 8 and the cage 7, the bypass device 20 and the sleeve 35, wherein the unit retains the aforementioned components.

An intermediate space 19 is formed axially between the seal 3 and the bypass conductor 23. The intermediate space 19 is delimited axially in one direction toward the rolling elements 8 by the seal 3 and an end face of the inner ring 12, and axially in the other direction by the retaining disk 24, sections of the base body 27 of the retaining ring 22, as well as the holder 21 and the bypass conductor 23. In the radial directions, the intermediate space 19 is delimited by a section of the sleeve 35 and an inner surface of the overhang 42 on the outer ring 11. The intermediate space is connected via the cutouts 26 to the environment surrounding the rolling bearing 2 outside of the assembly unit 10 such that it is permeable to any media and contaminants, so that these can be exchanged unhindered via the cutouts 26.

FIG. 3—The clamps 29 surround the overhang 42 in an annular gap 43, which is formed radially between the overhang 42 and the inner surface of the bore of the housing 4. A gap remains between the respective clamp 29 and the housing 4, at which the clamp 29 and the housing 4 lie opposite one another in a radially non-contacting manner. An electrically conductive connection between the housing 4 and the bypass device 20 is made via the outer ring 11. In this way, an electrical connection between the first machine element 30 and the shaft 9 is formed via the bypass device 20. The electrical connection leads to the bypass conductor 23 via the holder 21. The bypass conductor 23 is in sliding contact with the hollow-cylindrical component 13, and the component 13, which is designed as the sleeve 35, is optionally insulated from the inner ring 12 in a non-conductive manner and is in contact with the shaft 9, for example by means of a press fit. In this case, the shaft 9 or alternatively the sleeve 35 is the second machine element 31. In another alternative case, there is an electrically conductive connection between the sleeve 35 and the inner ring 12, and the inner ring 12 is connected to the shaft 9 in a current-conducting manner. A radial air gap of at least the size of a clearance fit can be formed between the sleeve 35 and the shaft 9. In this case, the shaft 9 can also optionally be the second machine element 31.

Figure 7:
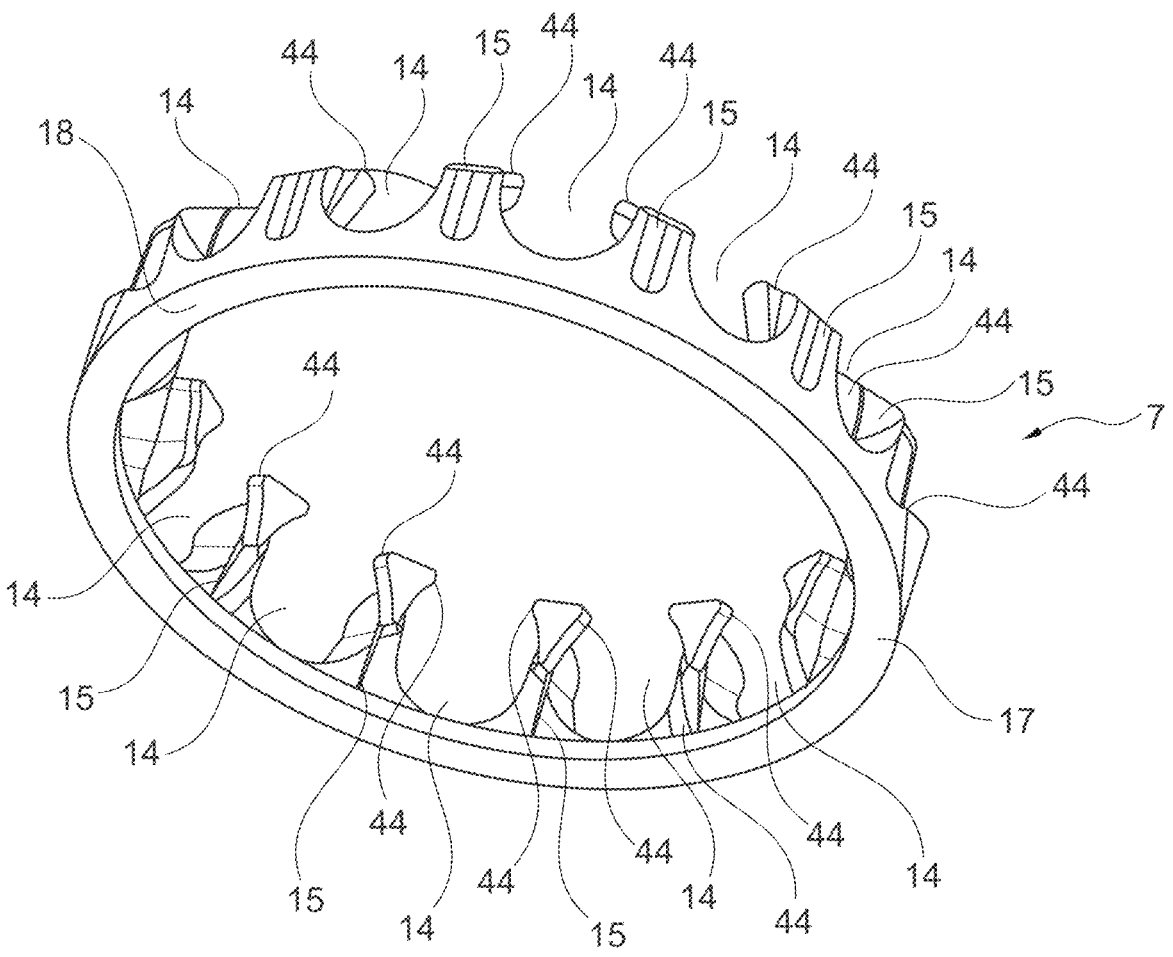
FIG. 7 shows a cage 7, which is installed, for example, in the rolling bearing 2 shown in FIG. 1.

FIG. 7—The exemplary embodiment of the cage 7 is designed as a ball cage that can be installed in a rolling bearing 2 shown in FIG. 1. The ball cage has a crown-shaped structure. The base of the cage 7 is a side edge 17 formed in the manner of an annular disk. On a side of the side edge 17 facing away from an axial end 18, webs 15 extend in the axial direction and protrude freely from the side edge 17. Each of the webs 15 has snap mountings 44 at the end on the side facing away from the side edge 17, each of which protrudes in the circumferential direction in the direction of a further snap mounting 44 of an adjacent web 15. A ball is snapped into each of the arcuate or U-shaped pockets 14 during the assembly of the rolling bearing 2 according to FIG. 1 and held in the axial direction to one side by the snap mountings 44.

FIG. 3—The end 18 of the side edge 17 that delimits the side edge 17 axially in the direction of the bypass conductor 23 runs radially between the axis of rotation 16 and the retaining element 25 or radially between the clamp 29 and the inner ring 12 around the axis of rotation 16.

Figure 4:
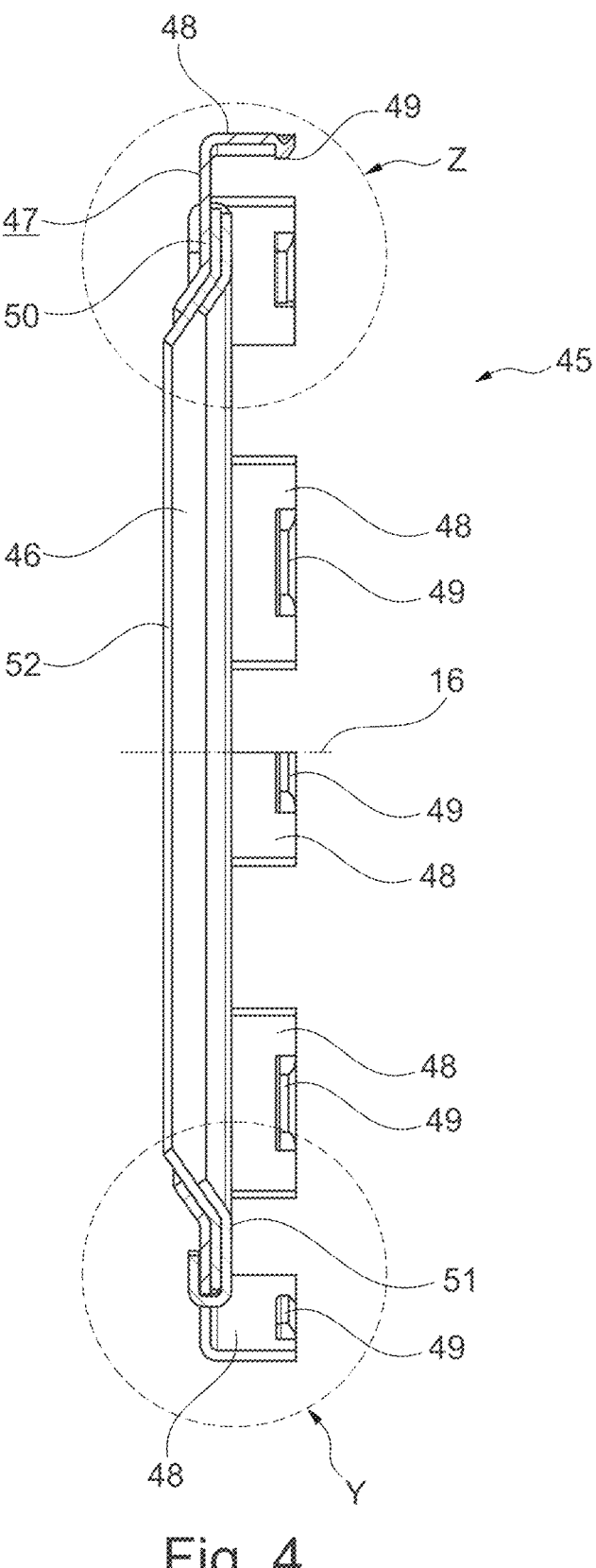
FIG. 4 shows an exemplary embodiment of a bypass device 45 in a longitudinal section.

FIG. 4—The bypass device 45 consists of a bypass conductor 46 and a holder 47. A retaining ring 50 of the holder 47 is provided with axially extending retaining elements 48. On the respective retaining element 48, a radial protrusion 49 for a snap mounting is formed on a rolling bearing, not shown. The holder 47 additionally has a retaining disk 51. The bypass conductor 46 is an annular disk having a through-hole 52 penetrating centrally through the axis of rotation 16.

Figure 5:
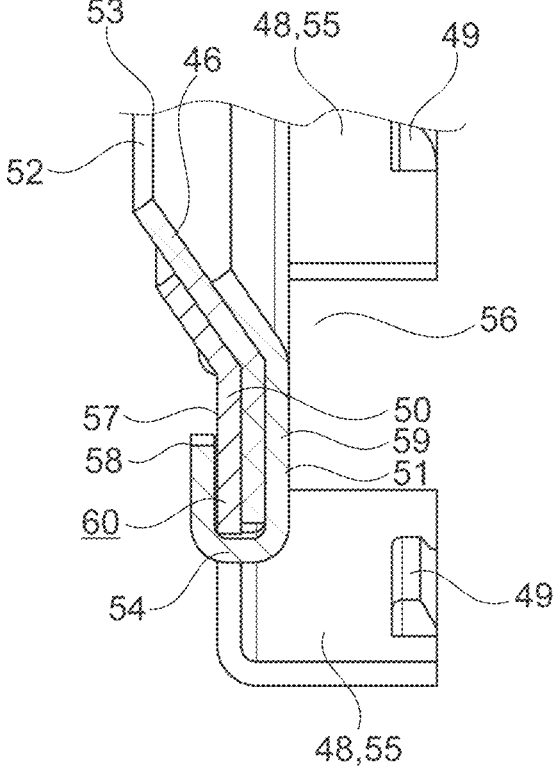
FIG. 5 shows the detail Y of the bypass device shown in FIG. 4.
Figure 6:
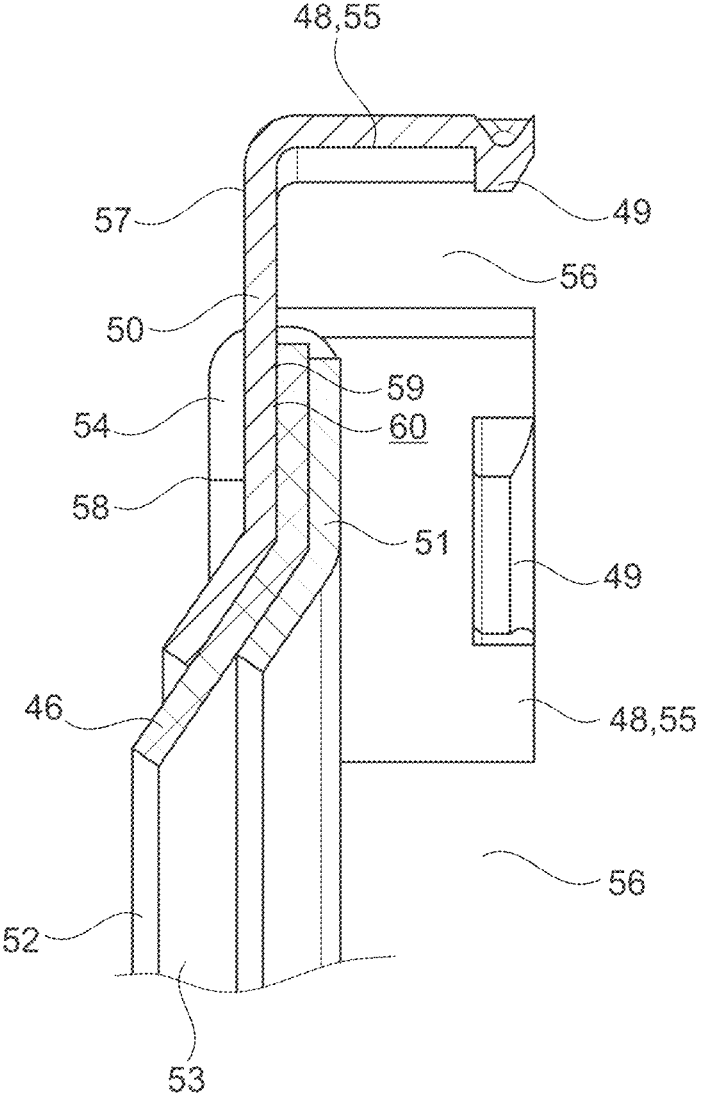
FIG. 6 shows the detail Z of the bypass device shown in FIG. 4.

FIGS. 5 and 6—The detail Y from FIG. 4 is enlarged in FIG. 5 and is not shown to scale. The detail Z from FIG. 4 is enlarged in FIG. 6 and is not shown to scale. At least the edge region 53 of the annular disk at the through-hole 52 is provided for contact with a shaft (not shown), alternatively with an inner ring (not shown), or alternatively with a hollow-cylindrical component similar to the component 13 shown in FIG. 1. The bypass conductor 46 is clamped axially between the retaining disk 51 and the retaining ring 50, and consists of a mesh or fabric of electrically conductive carbon fibers. The retaining elements 48 are formed in one piece and of one material with the retaining ring 50 and are elastic clamps 55, with the axially directed end of which the radial projection 49 is formed in one piece and of one material in each case. The retaining elements 48 are spaced apart from one another circumferentially by cutouts 56.

The clamping elements 54 on the retaining disk 51 are formed in one piece and of one material. The retaining disk 51 bears against the bypass conductor 46 on the rear side and axially penetrates one of the cutouts 56 with a clamping element 54. The clamping element 54 axially engages behind the retaining ring 50 on the front side 57 of the retaining ring 50 and bears axially with its radial end 58 against the front side 57 of the retaining ring 50. The retaining disk 51 on the rear side 59 of the retaining ring 50 and the clamping element 54 on the front side 57 of the retaining ring 50 form a form-fitting, but non-releasable, clamping connection 60 between the retaining ring 50, the bypass conductor 46, and the retaining disk 51. The retaining ring 50 and retaining disk 51 are components cut from sheet metal and cold-formed components.

FIGS. 8, 9, 10, and 11—FIGS. 8, 9, 10, and 11 show different embodiments of the bypass conductor 23, 46 which is are formed from loop-shaped stitched fibers.

Figure 8:
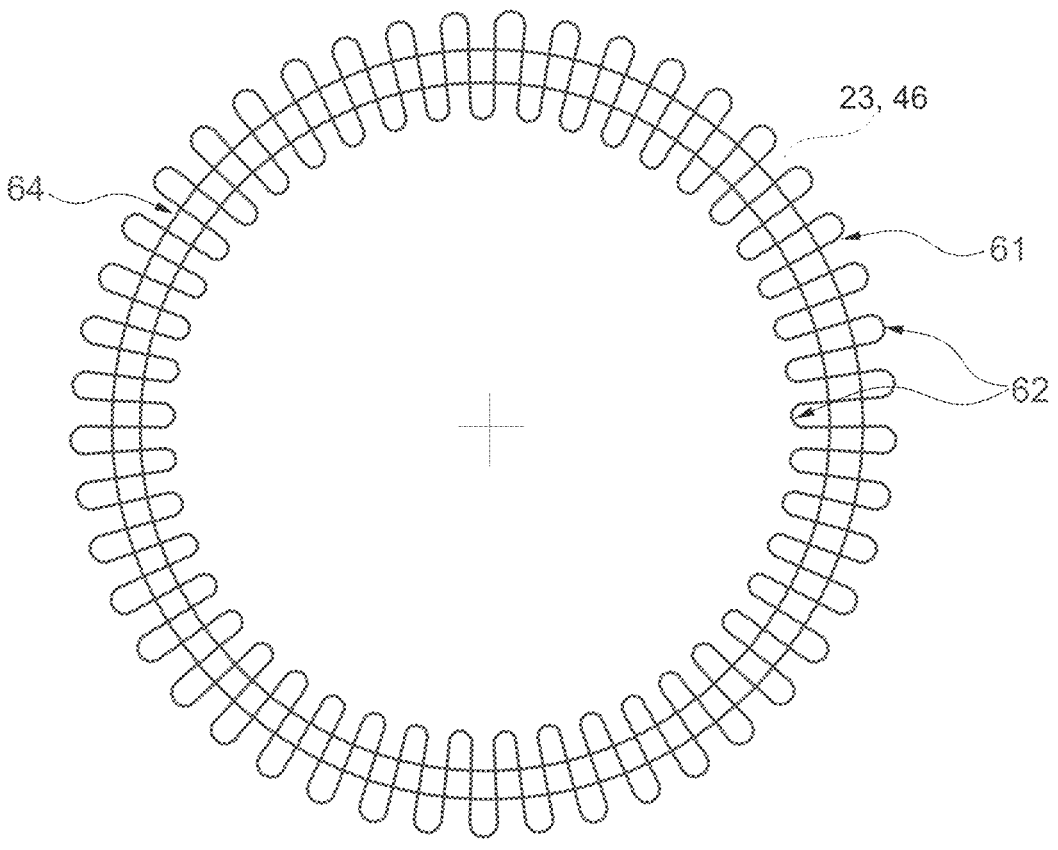
FIG. 8 shows an exemplary embodiment of the bypass conductor 23, 46 having loop-shaped stitched fibers with a meandering shape.

FIG. 8—The bypass conductor 23, 46 is shown schematically with respect to its structure. Here, the loop-shaped stitched fibers 61 of the bypass conductor 23, 46 are stitched with a meandering shape. The loops 64 are formed both on the distal side and on the proximal side with respect to the center of the bypass conductor. Furthermore, the concentrically arranged, stitched fiber bundle is shown, which serves to improve fiber cohesion.

Figure 9:
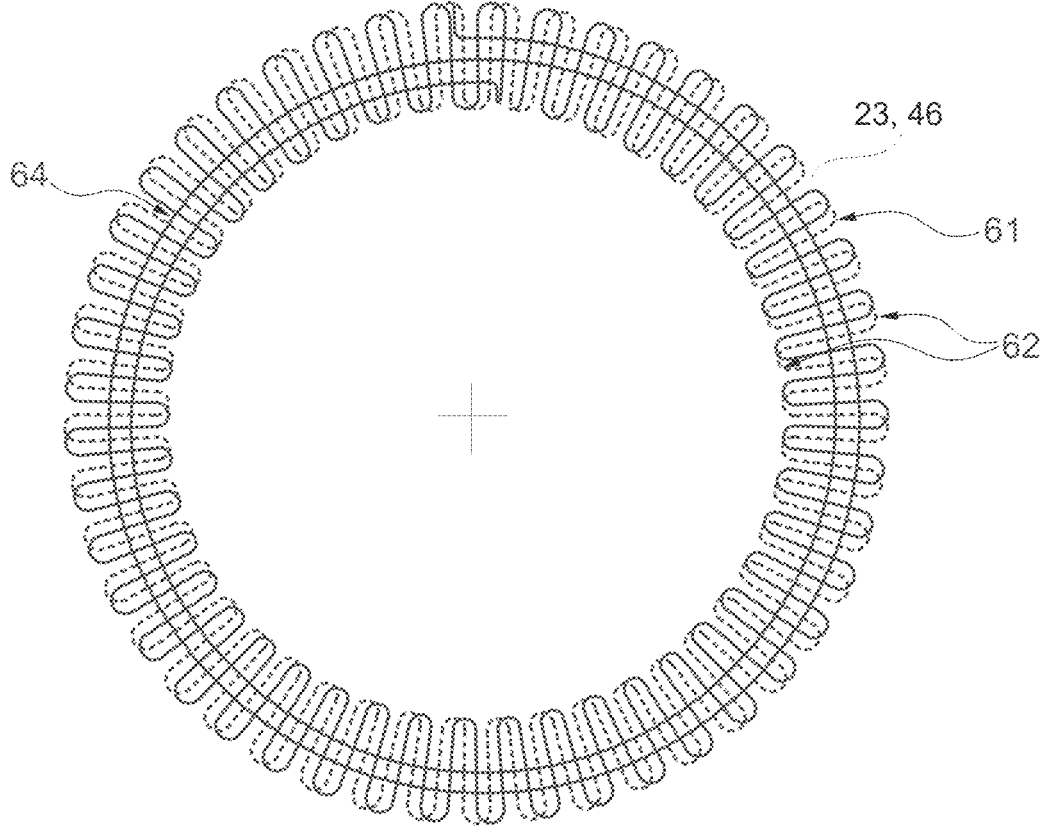
FIG. 9 shows a further exemplary embodiment of the bypass conductor 23, 46 having loop-shaped stitched fibers in a superimposed meandering shape.

FIG. 9—The bypass conductor 23, 46 is shown schematically with respect to its structure. Here, the loop-shaped stitched fibers, or fiber bundles 61, of the bypass conductor 23, 46 are stitched with a double-superimposed meandering shape. This embodiment also shows the further, concentrically arranged stitched fiber bundle.

Figure 10:
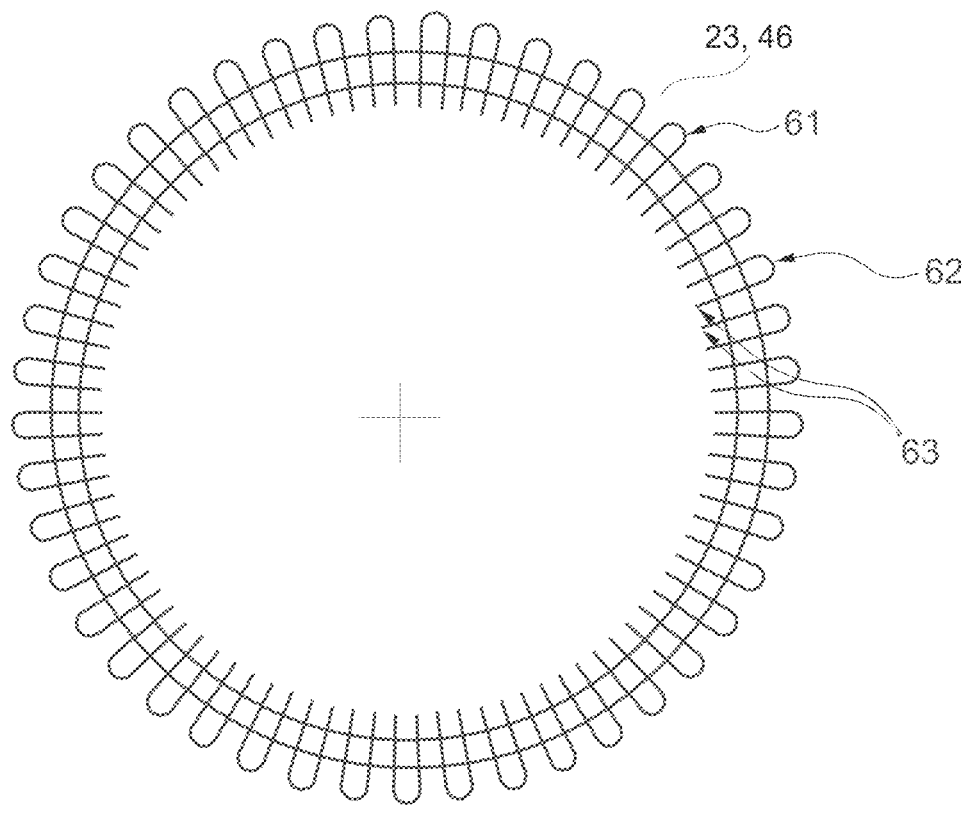
FIG. 10 shows a further exemplary embodiment of the bypass conductor 23, 46 having fiber cross-sections open proximally to the axis of rotation.

FIG. 10—The bypass conductor 23, 46 is shown schematically with respect to its structure. Here, the loop-shaped stitched fibers or fiber bundles 61 of the bypass conductor 23, 46 have proximally open fiber cross-sections 63 pointing to the axis of rotation.

Figure 11:
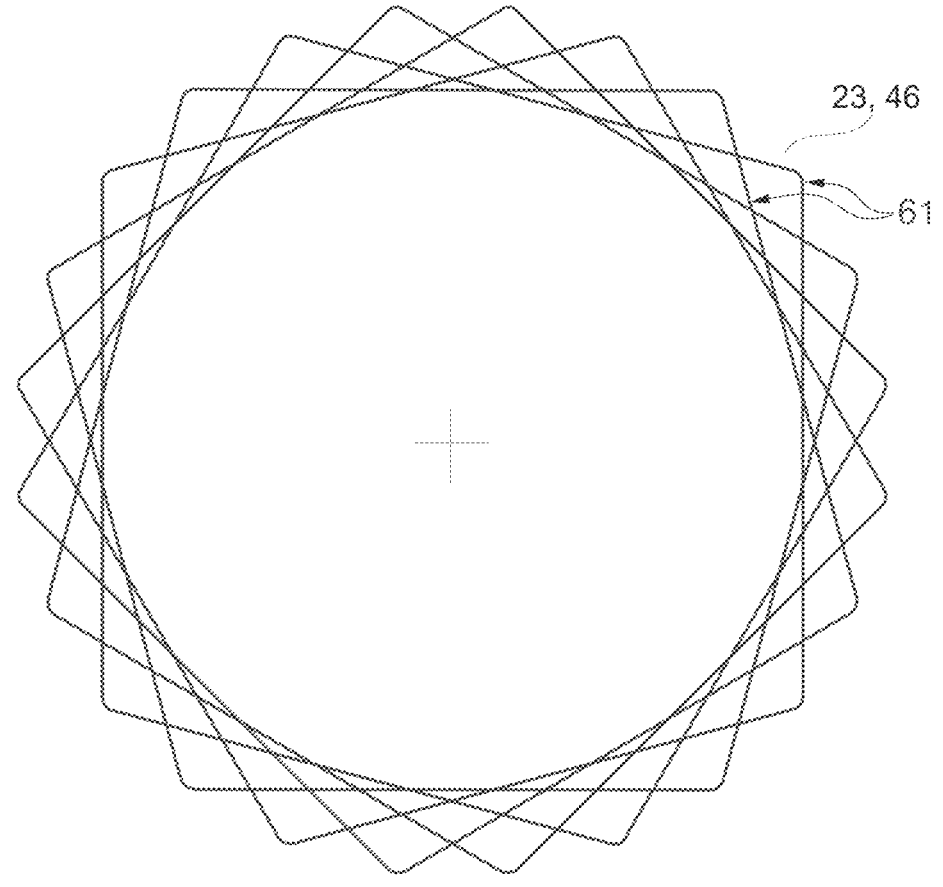
FIG. 11 shows a further exemplary embodiment of the bypass conductor 23, 46 having loop-shaped stitched fibers with a polygon shape.

FIG. 11—In the embodiment shown here, the bypass conductor 23, 46 shows loop-shaped stitched fibers or fiber bundles 61 of the bypass conductor 23, 46 with a polygon shape.

REFERENCE NUMERALS

1 Rolling bearing apparatus
2 Rolling bearing
3 Seal
4 Housing
5 First bearing ring
6 Second bearing ring
7 Cage
8 Rolling element
9 Shaft
10 Assembly unit
11 Outer ring
12 Inner ring
13 Hollow-cylindrical component
14 Pocket of the cage
15 Web of the cage
16 Axis of rotation of the rolling bearing
17 Side edge
18 Axial end of side edge
19 Intermediate space
20 Bypass device
21 Holder of the bypass device
22 Retaining ring
23 Bypass conductor
24 Retaining disk
25 Retaining element
26 Cutout
27 Base body of the holder
28 Retaining clip
29 Clamp
30 First machine element
31 Second machine element
32 Clamping element
33 Annular gap
34 Seal
35 Sleeve
36 Annular gap
37 Lever arm
38 Inner seat surface
39 Outer seat surface
40 Radial depression, annular groove
41 Radial protrusions
42 Overhang
43 Annular gap
44 Snap mounting of the cage
45 Bypass device
46 Bypass conductor
47 Holder of the bypass device
48 Retaining element
49 Radial protrusion of the retaining element
50 Retaining ring
51 Retaining disk
52 Through-hole
53 Edge region of the through-hole
54 Clamping element
55 Clamp
56 Cutout
57 Front side of the retaining ring
58 End of the clamping element
59 Rear side of the retaining ring
60 Clamping connection
61 Fiber bundles
62 Loop
63 Proximally open fiber cross-sections
64 Concentrically arranged fiber bundle

The invention claimed is:

1. A rolling bearing apparatus, which is formed from at least one rolling bearing, a seal, and a bypass device, and also has a first machine element and a second machine element, wherein:

the rolling bearing has a first bearing ring and a second bearing ring, and wherein the bearing rings are arranged concentrically on an axially aligned axis of rotation of the rolling bearing, the rolling bearing is provided with rolling elements arranged radially between the bearing rings and directed radially transversely to the axis of rotation, the seal is arranged radially between the bearing rings, at least one electrical connection between the first machine element and the second machine element is formed via the bypass device, the bypass device has a holder and at least one electrically conductive bypass conductor, and wherein the holder and the bypass conductor are connected to one another in an electrically conductive manner, the holder is fastened radially between one of the bearing rings and one of the machine elements to the one of the bearing rings and holds the bypass conductor, wherein the one of the bearing rings is fastened to the machine element, wherein the bypass conductor is formed from loop-shaped stitched fibers, and wherein the loop-shaped stitched fibers are: i) arranged in a polygon shape, or ii) stitched to a concentrically arranged fiber bundle.

2. The rolling bearing apparatus according to claim 1, wherein the loop-shaped stitched fibers of the bypass conductor are stitched in a meandering path.

3. The rolling bearing apparatus according to claim 1, wherein the loop-shaped stitched fibers of the bypass conductor are stitched in a double-superimposed meandering shape.

4. The rolling bearing apparatus according to claim 1, wherein the loop-shaped stitched fibers of the bypass conductor have fiber cross-sections which are open proximally to the axis of rotation.

5. The rolling bearing apparatus according to claim 1, wherein the loop-shaped stitched fibers of the bypass conductor comprise components of carbon or carbon derivatives.

6. The rolling bearing apparatus according to claim 1, wherein the loop-shaped stitched fibers of the bypass conductor are stitched on a textile base fabric.

7. A rolling bearing apparatus, comprising:

a first machine element;

a second machine element;

a rolling bearing comprising:

an axially aligned axis of rotation;

a first bearing ring;

a second bearing ring arranged concentric to the first bearing ring on the axis of rotation and fastened to the first machine element; and rolling elements arranged radially between the first bearing ring and the second bearing ring, and directed radially transversely to the axis of rotation;

a seal arranged radially between the first bearing ring and the second bearing ring; and a bypass device forming an electrical connection between the first machine element and the second machine element, the bypass device comprising:

an electrically conductive bypass conductor formed from loop-shaped stitched fibers, and the loop-shaped stitched fibers are: i) arranged in a polygon shape, or ii) stitched to a concentrically arranged fiber bundle; and a holder:

holding the bypass conductor in an electrically conductive manner; and fastened to the second bearing ring radially between the first machine element and the second bearing ring.

8. The rolling bearing apparatus of claim 7, wherein the loop-shaped stitched fibers are stitched in a meandering path.

9. The rolling bearing apparatus of claim 7, wherein the loop-shaped stitched fibers are stitched in a double-superimposed meandering shape.

10. The rolling bearing apparatus of claim 7, wherein the loop-shaped stitched fibers have fiber cross-sections which are open proximally to the axis of rotation.

11. The rolling bearing apparatus of claim 7, wherein the loop-shaped stitched fibers comprise components of carbon or carbon derivatives.

12. The rolling bearing apparatus of claim 7, wherein the loop-shaped stitched fibers are stitched on a textile base fabric.

* * * * *